US012798602B2

(12) United States Patent
Sommer

(10) Patent No.: US 12,798,602 B2
(45) Date of Patent: Nov. 17, 2026

(54) METHOD FOR OPERATING A DRIVER ASSISTANCE SYSTEM OF A VEHICLE IN SPECIAL SITUATIONS

(71) Applicant: Volkswagen Aktiengesellschaft, Wolfsburg (DE)

(72) Inventor: Sven Sommer, Uetze (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 7 days.

(21) Appl. No.: 19/043,444

(22) Filed: Feb. 1, 2025

(65) Prior Publication Data

US 2025/0249921 A1 Aug. 7, 2025

(30) Foreign Application Priority Data

Feb. 5, 2024 (DE) ........................ 102024201010.3

(51) Int. Cl.

*B60W 50/14* (2020.01)
*B60W 10/18* (2012.01)
B60W 30/09 (2012.01)
*B60W 50/00* (2006.01)

(52) U.S. Cl.

CPC ............ *B60W 50/14* (2013.01); *B60W 10/18* (2013.01); *B60W 30/09* (2013.01);
(Continued)

(58) Field of Classification Search

CPC ...... B60W 50/14; B60W 10/18; B60W 30/09; B60W 2050/0083; B60W 2050/143;
(Continued)

(56) References Cited

U.S. PATENT DOCUMENTS 8,577,552 B1 * 11/2013 Smit ..................... G01S 13/931 701/41
10,134,278 B1 * 11/2018 Konrardy ............... G08G 1/166
(Continued)

FOREIGN PATENT DOCUMENTS

CN 111508275 A 8/2020
CN 115209305 A 10/2022
(Continued)

OTHER PUBLICATIONS

Priority German Application No. 102024201010.3. Examination Report (May 15, 2024).

*Primary Examiner* — Omeed Alizada
(74) *Attorney, Agent, or Firm* — Peter Zura; LOZA & LOZA, LLP

(57) ABSTRACT

A method, driver assistance system, and vehicle are provided for optimizing the operation of a driver assistance system in specific situations. The method includes determining whether the vehicle is located within a predefined surrounding area of at least one object from a predetermined object group. If the vehicle is within the predefined surrounding area, the driver assistance system is modified by establishing a reduced trigger threshold compared to a predetermined trigger threshold at which a driver assistance function is activated, reducing the intensity of or deactivating a first warning signal, and/or deactivating the driver assistance function. The driver assistance system includes a control unit configured to execute the method and a sensor system for detecting the predefined surrounding area. A vehicle incorporating the driver assistance system adapts its warnings and interventions based on its proximity to predefined objects, preventing unnecessary alerts and optimizing driver assistance functions.

20 Claims, 2 Drawing Sheets

(52) U.S. Cl.
CPC ............... *B60W 2050/0083* (2013.01); *B60W 2050/143* (2013.01); *B60W 2050/146* (2013.01); *B60W 2554/80* (2020.02); *B60W 2555/20* (2020.02); *B60W 2556/40* (2020.02)

(58) Field of Classification Search
CPC ....... B60W 2050/146; B60W 2554/80; B60W 2555/20; B60W 2556/40; B60W 40/02; B60W 50/0098; B60W 2552/50; B60W 30/18063
See application file for complete search history.

(56) References Cited

U.S. PATENT DOCUMENTS

| | | | | |
|---|---|---|---|---|
| 2005/0068197 | A1* | 3/2005 | Regan | G08G 1/168 340/932.2 |
| 2005/0075788 | A1* | 4/2005 | Smith | B60Q 1/22 701/301 |
| 2016/0068158 | A1* | 3/2016 | Elwart | B60W 30/06 701/1 |
| 2019/0023280 | A1* | 1/2019 | Maus | B60W 50/085 |
| 2019/0205672 | A1* | 7/2019 | Stephan | B60W 40/02 |
| 2023/0339734 | A1 | 10/2023 | Stahle et al. | |

FOREIGN PATENT DOCUMENTS

| | | | |
|---|---|---|---|
| DE | 102006044803 | A1 | 3/2008 |
| DE | 102016114160 | A1 | 2/2018 |
| DE | 102018209336 | A1 | 12/2019 |
| DE | 102021131571 | A1 | 6/2023 |
| DE | 102021132544 | A1 | 6/2023 |
| DE | 102023103139 | A1 | 10/2023 |
| WO | 2017155448 | A1 | 9/2017 |

* cited by examiner

METHOD FOR OPERATING A DRIVER ASSISTANCE SYSTEM OF A VEHICLE IN SPECIAL SITUATIONS

RELATED APPLICATIONS

The present application claims priority to German Patent Application No. 102024201010.3, filed Feb. 5, 2024, the contents of which is incorporated by reference in its entirety herein.

TECHNICAL FIELD

The present disclosure relates to a method for operating a driver assistance system of a vehicle, to a driver assistance system configured for use in such a method, and to a vehicle comprising such a driver assistance system.

BACKGROUND

Known driver assistance systems include functions that monitor the surroundings of a vehicle using a sensor device to detect the presence of both moving and stationary objects. These systems are configured to provide an optical and/or acoustic warning to a driver when a minimum distance to an object is breached, thereby helping to prevent a collision between the vehicle and the object. The intensity of the warning generally increases as the vehicle moves closer to the object. A driver assistance system with such functionality is disclosed in CN 111508275 A1.

In addition to issuing warnings, the monitoring of objects in the vehicle's surroundings by a driver assistance system can also be utilized, as described in DE 10 2006 044 803 A1, to initiate an emergency braking procedure in response to an imminent collision. If it is determined that the vehicle, under its current trajectory, would not brake in time to avoid a collision, the system can autonomously intervene by applying the brakes.

Another function of a driver assistance system involves recognizing specific traffic situations, such as the approach of an emergency vehicle. For example, as disclosed in DE 102021132544 A1, upon detecting an approaching ambulance, the system may automatically reduce the intensity of the vehicle's audio output. This ensures that the driver can perceive the auditory signals of the emergency vehicle without obstruction.

While issuing warnings or actively intervening in vehicle operation is generally beneficial—such as in situations involving potential collisions with pedestrians or other vehicles—there are scenarios in which a vehicle is deliberately maneuvered close to an object. Examples of such scenarios include approaching toll booths or barrier systems, where the driver is intentionally guiding the vehicle toward an object to interact with it. In these cases, repeated audio warnings from the driver assistance system, especially those that increase in frequency as the vehicle nears the object, may become a distraction. Additionally, an emergency braking intervention upon reaching a predefined critical distance from the object would be unnecessary and could disrupt the intended maneuver.

SUMMARY

Aspects of the present disclosure are directed to providing technologies and techniques for operating a driver assistance system of a vehicle which is optimized for special situations.

Some aspects are disclosed in the independent claims of the present application, detailed below. Additional aspects are disclosed in the dependent claims, the description and the drawings.

In some examples, a method is disclosed for operating a driver assistance system of a vehicle. The method includes determining whether the vehicle is located within a predefined surrounding area associated with at least one object from a predetermined object group. If it is established that the vehicle is within the predefined surrounding area, the method further includes modifying the operation of the driver assistance system by either adjusting the threshold for triggering a driver assistance function, reducing the intensity or deactivating the output of a first warning signal issued by the driver assistance system, and/or deactivating the driver assistance function itself. The reduction in the trigger threshold allows for a more adaptable response based on the specific surroundings, ensuring that unnecessary warnings or interventions are minimized when the vehicle is intentionally positioned near certain objects.

In some examples, a driver assistance system is disclosed, which is configured for use in the method described herein. The driver assistance system is designed to determine whether the vehicle is within a predefined surrounding area of at least one object from a predetermined object group. Upon detecting that the vehicle is within this area, the system is further configured to modify its operational parameters by adjusting the trigger threshold for activating a driver assistance function, reducing or deactivating the output of a first warning signal, and/or deactivating the driver assistance function itself. This configuration ensures that the system can adapt its response based on the vehicle's surroundings, preventing unnecessary warnings or interventions in scenarios where the driver intentionally maneuvers the vehicle near an object.

In some examples, a vehicle is disclosed that includes a driver assistance system configured to operate in accordance with the described method. The driver assistance system is designed to detect whether the vehicle is within a predefined surrounding area of at least one object from a predetermined object group. If the vehicle is determined to be within this area, the system can modify its operation by adjusting the trigger threshold for activating a driver assistance function, reducing or deactivating the output of a first warning signal, and/or deactivating the driver assistance function itself. By incorporating this driver assistance system, the vehicle can optimize its responses based on contextual surroundings, ensuring that unnecessary warnings or interventions are avoided in situations where the driver deliberately maneuvers the vehicle near an object.

The present disclosure further provides a driver assistance system configured for use in the method described herein. The driver assistance system preferably includes a sensor system or is operatively connected to a sensor system of the vehicle. Additionally, the driver assistance system comprises a control unit that is configured to execute the aforementioned method steps. In particular, the control unit is connected to the sensor system to receive sensor signals and to transmit control signals as needed. Furthermore, the control unit is operatively connected to the vehicle's display device to provide relevant output information to the driver.

The present disclosure also provides a vehicle that includes the driver assistance system as described. By integrating this system, the vehicle is capable of dynamically adapting its driver assistance functions based on its surrounding environment, thereby preventing unnecessary warnings or interventions in situations where the driver deliberately maneuvers the vehicle near an object.

Further exemplary implementations of the present disclosure are described in greater detail below with reference to the accompanying drawings.

DETAILED DESCRIPTION

Figure 1:
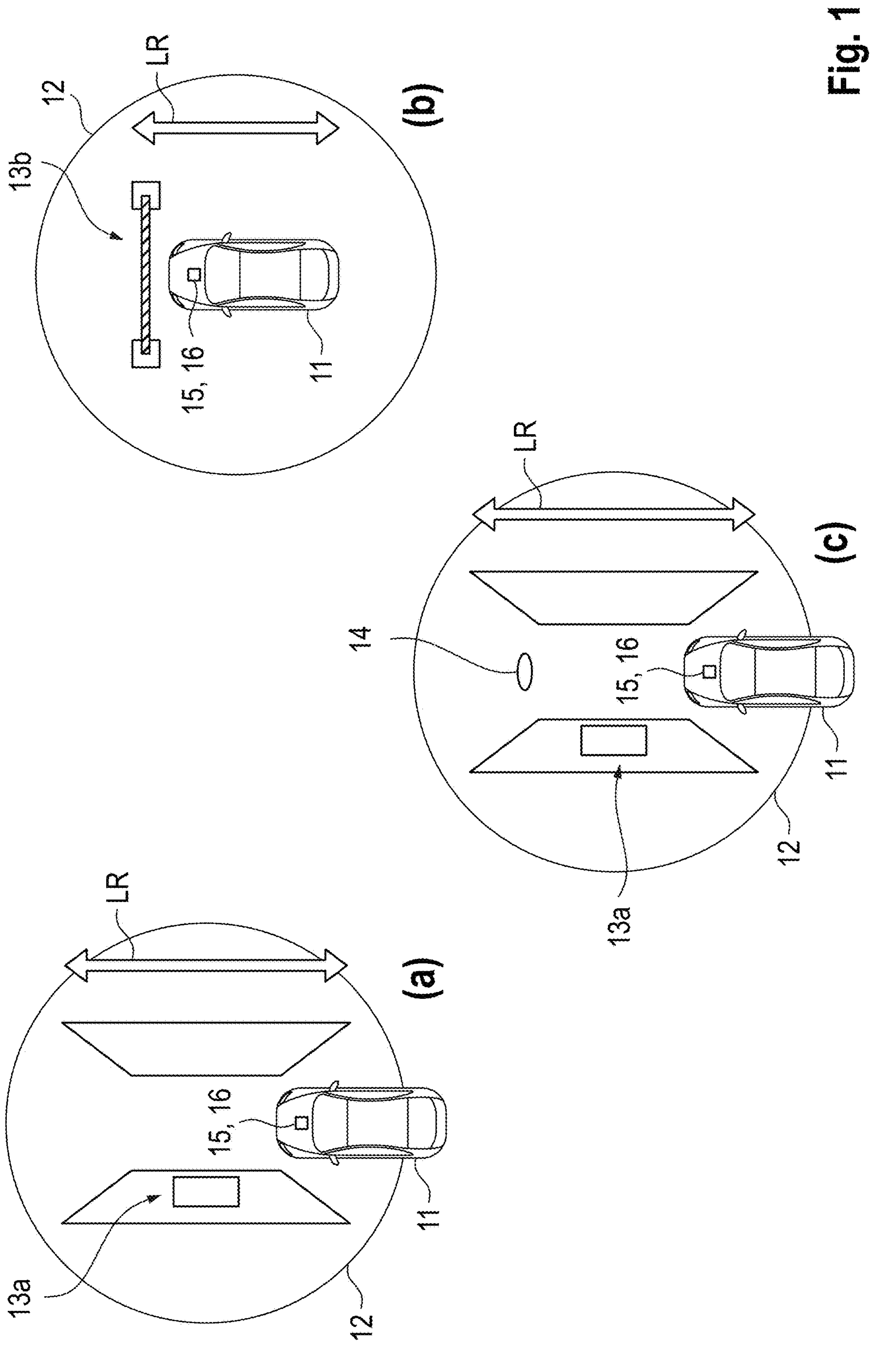
FIGS. 1*a* to 1*c* illustrate various scenarios in which objects are positioned within a predetermined surrounding area of a vehicle, according to some aspects of the present disclosure.

In the figures, identical design elements have the same reference numerals.

In various examples disclosed herein, the operation of a driver assistance system is modified when the vehicle approaches specific objects in predetermined situations. In such cases, the system adapts its behavior to reduce or prevent the output of disruptive warnings. This is achieved by either reducing the trigger threshold at which a driver assistance function is activated, decreasing the intensity of a warning signal, suppressing the output of the warning signal entirely, or deactivating the driver assistance function. These adjustments ensure that the driver is not unnecessarily disturbed, and unintended interventions in vehicle operation are avoided. Such modifications are appropriate in scenarios where the driver intentionally navigates the vehicle near an object, thereby preventing unnecessary activation of the driver assistance function.

The modifications to the driver assistance system—such as the reduction of the trigger threshold, the reduction or deactivation of the warning signal, or the deactivation of the driver assistance function—are applied exclusively to one or more recognized objects within the predefined surrounding area. These adjustments do not affect all other objects in the vehicle's environment; instead, the driver assistance system continues to respond to such objects in its default manner.

The driver assistance function may include, but is not limited to, a distance warning function, a braking assistance function, and/or a maneuver assistance function. In the case of a distance warning function, a warning is issued when the vehicle falls below a predetermined distance from an object. The braking assistance function initiates emergency braking if the vehicle approaches an object beyond a critical threshold. The maneuver assistance function enables the vehicle to autonomously adjust its path to avoid a collision with a detected object.

The trigger threshold is preferably a predefined distance between the object and the vehicle. The predetermined trigger threshold is selected such that when this distance is breached, the driver assistance function is activated, either by issuing a warning signal, engaging braking assistance, or initiating maneuver assistance. The reduced trigger threshold is a secondary distance, which is shorter than the predefined trigger threshold, allowing the system to activate later than under normal conditions. By implementing a reduced trigger threshold, the driver assistance function is triggered only when absolutely necessary, preventing premature activation in controlled driving scenarios.

Additionally, or as an alternative, the intensity of the warning signal may be reduced when the trigger threshold is reached. This ensures that the driver remains aware of their proximity to the object while minimizing unnecessary distractions. In some cases, the driver assistance system may be fully deactivated, eliminating all warning signals.

In the context of the distance warning function, when the vehicle is detected within the predetermined surrounding area, the system may delay the issuance of a warning signal, triggering it only at a closer distance. Additionally, the intensity of the warning signal may be reduced when it is eventually activated. Alternatively, the system may adjust only the warning signal intensity without modifying the trigger threshold. In some cases, the distance warning function may be completely deactivated within the predetermined surrounding area.

For the braking assistance function or maneuver assistance function, a similar approach is applied. The system may reduce the trigger threshold, decrease the intensity of the warning signal upon activation, or disable the function entirely within the predetermined surrounding area.

The modifications to the driver assistance function-whether through adjusting the trigger threshold, reducing or deactivating warning signals, or disabling the function—are applied exclusively to recognized objects within the predetermined surrounding area. Other objects, such as pedestrians, other road users, or moving objects that do not belong to the predefined object group, continue to be processed using the default system parameters. For these objects, the system maintains its standard trigger threshold, warning signal intensity, and activation of driver assistance functions.

The predetermined surrounding area of an object is preferably determined based on the position of the object. The boundary of this area may be defined by a set distance from the object, encompassing all points within that distance relative to the vehicle.

Alternatively, the predetermined surrounding area may be defined by a specific route section relative to the object. In this case, the route section represents the distance over which the vehicle travels past or through the object's vicinity. The modifications to the trigger threshold, warning signal intensity, or driver assistance function activation remain in effect as long as the vehicle is moving along this predefined route section.

The system continually monitors whether the vehicle remains within the predetermined surrounding area. The reduction of the trigger threshold, warning signal intensity, or deactivation of the driver assistance function persists while the vehicle is within this area. To achieve this, the vehicle's position is continuously compared to the defined surrounding area.

The determination of whether the vehicle is located in the predetermined surrounding area may be carried out by a surroundings detection device, such as a camera system. The surroundings detection device is preferably integrated into the driver assistance system and may also be used for other driver assistance functions. The detection of objects within the surrounding area may be performed through distance measurements, such as LIDAR, ultrasonic, and/or radar sensors, or through image data analysis. The vehicle's distance from the object is determined, allowing the system to identify whether the vehicle is within a defined proximity. The integration of multiple sensor types, including merged sensor data from distance measurement and image recognition, enhances detection accuracy by mitigating the limitations of individual sensors.

The predetermined trigger threshold may be located either within or outside the predetermined surrounding area. The surrounding area can be defined such that the trigger threshold is not reached immediately upon entry but is only activated at a smaller distance. This ensures that premature activation of the driver assistance function does not occur before the vehicle is properly recognized within the surrounding area.

Alternatively, the predetermined trigger threshold may be set at the boundary of the predetermined surrounding area, ensuring that driver assistance functions are adjusted as soon as the vehicle enters the area.

The determination of whether the vehicle is located within the predetermined surrounding area is preferably based on information obtained from a surroundings map. In particular, at least all known objects belonging to the predetermined object group are stored in a digital surroundings map, allowing their positions relative to the vehicle's current position to be determined. The present vehicle position is preferably obtained via satellite navigation, such as GPS. To facilitate this determination, objects are pre-classified to establish whether they belong to the predetermined object group and should be treated according to the described method. The classification information, along with the object's position in the surroundings map, is referred to as meta-information. Based on the vehicle's current position, the system determines whether one or more objects from the predetermined object group are within the vehicle's surroundings and whether the vehicle is located within the predefined surrounding area of any such object.

In some cases, the system may determine that the vehicle is simultaneously located within the surrounding areas of multiple objects. For example, a switch and a barrier may be recognized as separate entities, and the system can treat each object independently while applying the described method accordingly.

The determination of whether an object belongs to the predetermined object group can be carried out either directly or indirectly. For example, as described above, classification may be based on information stored in the surroundings map. This classification may rely on the known type of the object or on geometric conditions in the environment that are either pre-recorded or detected in real time. For example, the width and/or length of a passageway or object dimensions such as length and width—can be used to infer the presence of an object from the predetermined object group. The system may obtain information about geometric conditions either from the surroundings map or through real-time detection by the driver assistance system. The latter approach may involve recognizing signage or directly measuring passageway dimensions using onboard sensors.

Additionally, the driver assistance system or the vehicle's onboard sensors may autonomously recognize objects and classify them based on sensor data, such as image processing techniques applied to captured image data.

The predetermined object group preferably includes toll booths, barrier systems, operational switches, charging stations, and/or access control devices. These objects typically require the vehicle to approach within a relatively small distance, where unnecessary warnings or system interventions would be disruptive or unnecessary. As described above, these objects may be pre-stored in a surroundings map or detected in real time by the vehicle's sensor system.

The object group can be continually updated or expanded by adding newly constructed or newly recognized objects. The updated information, including object positions, may be stored and retrieved in a decentralized manner, such as via a cloud storage system. Alternatively, the information may be stored locally within the vehicle's onboard memory. A decentralized approach provides the advantage that multiple vehicles can access and update the object database via a wireless data connection, ensuring that vehicles always operate with the most current information. If a vehicle detects a new object in its surroundings, it may transmit this information to the cloud memory, allowing the object group and/or the surroundings map to be updated dynamically.

The first warning signal is preferably an acoustic warning signal. When it is determined that an object is located within the vehicle's predetermined surrounding area, the system reduces the volume of the warning signal, particularly as the vehicle approaches the object. Alternatively, the warning signal may be completely suppressed.

The first warning signal is preferably triggered when the predetermined trigger threshold of the driver assistance system is reached. This means that the warning sound is typically activated when the predetermined trigger threshold is breached, such as when the driver assistance system detects that the vehicle has fallen below a minimum safe distance from an object, the braking assistance function initiates an emergency braking maneuver, and/or the maneuver assistance function intervenes in vehicle control.

In addition to determining whether the vehicle is located within the predetermined surrounding area, additional parameters may be considered when deciding whether to modify the trigger threshold, reduce or suppress the first warning signal, and/or deactivate the driver assistance function.

One such parameter is the status of the vehicle's ignition, particularly terminal 15. For example, the method may be configured to operate only when the ignition is active or, conversely, when it is inactive. Preferably, the system detects whether the ignition is switched on, allowing the system to infer whether the vehicle is operational or ready to be driven. In some examples, the described method is executed only when the vehicle is in an operational state, as certain driver assistance functions can only be activated under these conditions. If the vehicle is parked and unable to move, warnings regarding potential collisions are unnecessary.

Another relevant parameter is the vehicle's current driving mode, engaged gear, and/or parking brake status. If the vehicle is in neutral or no gear is engaged, the system may refrain from modifying driver assistance functions, even if the vehicle is within the predetermined surrounding area. This prevents situations in which a driver could inadvertently miss a warning about unintentional rolling when the vehicle is in idle. Such scenarios may occur at access control barriers, where a vehicle can roll forward without an engaged driving mode. Similarly, if the parking brake is engaged, the vehicle is in "P" (park) mode, or a parking lock mechanism is active, the method may not be executed, as driver assistance functions are generally inactive in such states. Conversely, the method may be applied only when the vehicle is in "D" (drive) mode or a gear is engaged, ensuring that the system responds only when the vehicle is actively moving.

Another parameter is the vehicle's traffic direction. In this context, traffic direction refers to the applicable driving lane configuration—specifically, whether the vehicle is operating in a right-hand or left-hand traffic system.

The vehicle's movement direction may also serve as a parameter. If the system determines that the vehicle is within the predetermined surrounding area but is moving away from the object rather than toward it, modifications to the driver assistance function may not be necessary.

The vehicle's speed may also influence whether the driver assistance function is modified. For instance, if the vehicle approaches an object within the surrounding area at a speed exceeding a predetermined threshold, the system may retain standard driver assistance behavior. In such cases, the first warning signal may be issued at normal intensity, and the driver assistance function remains active, as a higher speed may indicate an increased risk of collision.

The method preferably includes the output of a second warning signal, which is an optical warning signal. The second warning signal is primarily issued when the intensity of the first warning signal—typically an acoustic alert—is reduced or deactivated. This ensures that the driver remains aware of their proximity to an object while experiencing a less intrusive warning.

The second warning signal may be displayed on a vehicle display unit, such as an infotainment system screen or an Optical Parking System (OPS) display.

The second warning signal is preferably triggered when the predetermined trigger threshold of the driver assistance system is reached. This ensures that the driver continues to receive visual warnings regarding object proximity.

Additionally, a third warning signal may be issued to inform the driver that the first warning signal is being reduced or suppressed and/or that the driver assistance function has been deactivated. The third warning signal may take the form of an acoustic alert and/or an optical indicator displayed on the vehicle's interface.

FIGS. 1_a_ to 1_c_ illustrate various scenarios in which a vehicle 11 is positioned near an object 13_a_, 13_b_ from a predetermined object group. In each of these scenarios, the objects 13_a_, 13_b_ have an associated predetermined surrounding area 12, which is depicted as a radial surrounding area 12 encompassing the respective object. The surrounding area 12 is defined to include the object within its boundaries, allowing the driver assistance system to modify its operation when the vehicle enters this area.

FIG. 1_a_ depicts a scenario where a vehicle 11 approaches a toll booth 13_a_. Under normal conditions, the driver assistance system 15 would generate an acoustic and/or optical warning signal via a sensor system 16 to alert the driver of a potential collision with the toll booth 13_a_ as the vehicle moves closer. However, since the driver is intentionally maneuvering toward the toll booth 13_a_—for example, to make a payment—the acoustic warning may be perceived as disruptive. To mitigate this, the system determines when the vehicle 11 is located within the predetermined surrounding area 12 and subsequently modifies its behavior by either reducing a predetermined trigger threshold (i.e., the minimum distance at which a warning would typically be triggered) or suppressing the acoustic warning signal altogether. Additionally, the system may deactivate or adjust the trigger thresholds for an emergency braking assistance system and/or a maneuver assistance system to prevent unnecessary interventions.

In an alternative implementation, rather than defining the predetermined surrounding area 12 as a radial region, the surrounding area may take the form of a predetermined route section LR. In this case, the system determines whether the vehicle 11 is within the surrounding area 12 based on its position along the predefined route section LR. For example, the predefined route section LR may correspond to a passageway through the toll booth 13_a_.

FIGS. 1_b_ and 1_c_ illustrate scenarios similar to FIG. 1_a_, but with different objects from the predetermined object group. In FIG. 1_b_, the vehicle 11 approaches a barrier system 13_b_ instead of a toll booth 13_a_. In FIG. 1_c_, a situation analogous to FIG. 1_a_ is depicted, in which the vehicle 11 approaches a toll booth 13_a_. However, in this scenario, an additional object 14—which is not part of the predetermined object group—is also present within the surrounding area 12. The adaptation of the driver assistance system 15 in these cases follows the same principles as described for FIG. 1_a_. The surrounding area 12 may be defined either as a radial region or as a predetermined route section LR. Notably, the system treats the non-group object 14 using default driver assistance functions, meaning that the system does not apply reduced trigger thresholds, modified warnings, or deactivations to such objects.

Figure 2:
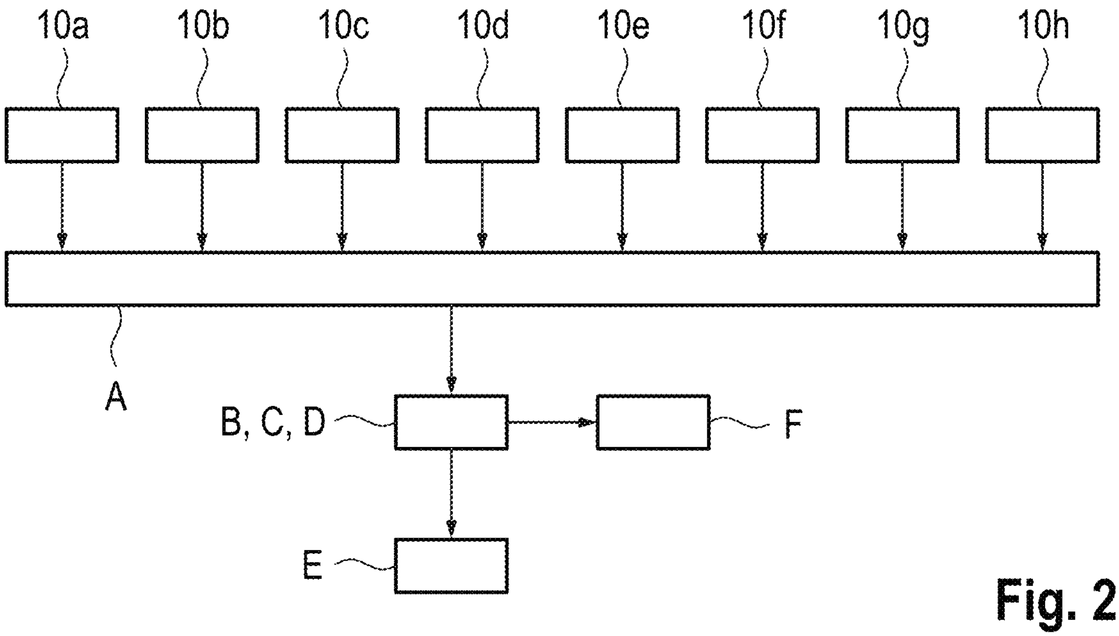
FIG. 2 depicts a flowchart of a method for operating a driver assistance system of a vehicle, according to some aspects of the present disclosure.

FIG. 2 provides a schematic representation of the method for operating the driver assistance system 15 of the vehicle 11. The process begins with method step A, in which the system determines whether the vehicle 11 is located within the predetermined surrounding area 12 of an object 13_a_, 13_b_ from the predetermined object group. During this step, one or more parameters 10_a_ to 10_h_ are evaluated to confirm whether the vehicle 11 is positioned within the surrounding area 12 under conditions that warrant an adaptation of the driver assistance system 15. These parameters include the status of the vehicle ignition, the current driving mode or gear selection, the traffic direction of the vehicle, and the vehicle's movement direction. Additional considerations include the global positioning system (GPS) location of the vehicle, information obtained from a surroundings map, the vehicle's speed, and environmental data from the vehicle's sensor system.

If it is determined—based on one or more of these parameters—that the vehicle 11 is within the predetermined surrounding area 12, the system proceeds to modify its operation. This includes method step B, in which the intensity of the acoustic warning signal is reduced. In method step C, the predetermined trigger threshold is lowered. Finally, in method step D, the driver assistance function is deactivated. Additionally, in method step E, an optical warning signal may be displayed on a vehicle display device, such as an optical parking system (OPS) display, to continue alerting the driver through visual means.

In method step F, a notification is provided on the display device, informing the driver that the driver assistance system 15 is currently operating in a reduced-capability mode as described in the foregoing steps.

LIST OF REFERENCE SIGNS

10_a_ to 10_h_ parameters
11 vehicle
12 radial surrounding area
13_a_, 13_b_ objects from predetermined object group
14 object not part of the object group
15 driver assistance system
16 sensor system
LR route section
A to F method steps

The invention claimed is:

1. A method for operating a driver assistance system of a vehicle, the method comprising:

determining whether the vehicle is located within a predetermined surrounding area of at least one object from a predetermined object group;

in response to determining that the vehicle is located within the predetermined surrounding area, modifying the operation of the driver assistance system by:

(i) establishing a reduced trigger threshold compared to a predetermined trigger threshold at which a driver assistance function is activated;

(ii) reducing an intensity of or deactivating an output of a first warning signal issued by the driver assistance system; and/or deactivating the driver assistance function, wherein modifying the operation of the driver assistance system comprises adjusting the trigger threshold based on a detected distance between the object and the vehicle.

2. The method of claim 1, further comprising activating the driver assistance function in response to the vehicle reaching the reduced trigger threshold, wherein the driver assistance function comprises at least one of issuing a distance warning, performing a braking assistance function, or executing a maneuver assistance function.

3. The method of claim 1, further comprising maintaining the predetermined trigger threshold for an object that does not belong to the predetermined object group [wherein modifying the operation of the driver assistance system comprises adjusting the trigger threshold based on a detected distance between the object and the vehicle].

4. The method of claim 1, further comprising determining the predetermined surrounding area based on a detected position of the object and defining a boundary of the predetermined surrounding area as a specified distance from the object.

5. The method of claim 4, further comprising adjusting the predetermined trigger threshold to be located either within or outside the predetermined surrounding area based on environmental conditions.

6. The method of claim 1, further comprising obtaining information from a surroundings map to determine whether the vehicle is located in the predetermined surrounding area.

7. The method of claim 1, further comprising identifying an object in the predetermined object group, wherein the predetermined object group includes at least one of a toll booth, a barrier system, an operating switch, a charging station, or an access control device.

8. The method of claim 1, further comprising outputting a first warning signal in the form of an acoustic warning when the vehicle reaches the reduced trigger threshold.

9. The method of claim 1, further comprising displaying a second warning signal in the form of an optical warning on a display unit of the vehicle when the vehicle reaches the reduced trigger threshold.

10. A driver assistance system for a vehicle, the system comprising:

a control unit configured to determine whether the vehicle is located within a predetermined surrounding area of at least one object from a predetermined object group;

wherein, in response to determining that the vehicle is located within the predetermined surrounding area, the control unit is configured to modify the operation of the driver assistance system by:

(i) establishing a reduced trigger threshold compared to a predetermined trigger threshold at which a driver assistance function is activated;

(ii) reducing an intensity of or deactivating an output of a first warning signal issued by the driver assistance system; and/or deactivating the driver assistance function, wherein the control unit is configured to adjust the trigger threshold based on a detected distance between the object and the vehicle.

11. The driver assistance system of claim 10, wherein the control unit is configured to activate the driver assistance function in response to the vehicle reaching the reduced trigger threshold, the driver assistance function comprising at least one of issuing a distance warning, performing a braking assistance function, or executing a maneuver assistance function.

12. The driver assistance system of claim 10, wherein the control unit is configured to maintain the predetermined trigger threshold for an object that does not belong to the predetermined object group [adjust the trigger threshold based on a detected distance between the object and the vehicle].

13. The driver assistance system of claim 10, further comprising a surroundings detection unit configured to determine the predetermined surrounding area based on a detected position of the object and to define a boundary of the predetermined surrounding area as a specified distance from the object.

14. The driver assistance system of claim 13, wherein the control unit is configured to adjust the predetermined trigger threshold to be located either within or outside the predetermined surrounding area based on environmental conditions.

15. The driver assistance system of claim 10, further comprising a surroundings map storage unit, wherein the control unit is configured to obtain information from the surroundings map to determine whether the vehicle is located in the predetermined surrounding area.

16. The driver assistance system of claim 10, wherein the control unit is configured to identify an object in the predetermined object group, the predetermined object group comprising at least one of a toll booth, a barrier system, an operating switch, a charging station, or an access control device.

17. The driver assistance system of claim 10, further comprising a warning signal output unit configured to generate a first warning signal in the form of an acoustic warning when the vehicle reaches the reduced trigger threshold.

18. The driver assistance system of claim 10, further comprising a display unit, wherein the control unit is configured to generate a second warning signal in the form of an optical warning displayed on the display unit when the vehicle reaches the reduced trigger threshold.

19. A vehicle comprising:

a driver assistance system including:

a control unit configured to determine whether the vehicle is located within a predetermined surrounding area of at least one object from a predetermined object group;

wherein, in response to determining that the vehicle is located within the predetermined surrounding area, the control unit is configured to modify the operation of the driver assistance system by:

(i) establishing a reduced trigger threshold compared to a predetermined trigger threshold at which a driver assistance function is activated;

(ii) reducing an intensity of or deactivating an output of a first warning signal issued by the driver assistance system; and/or deactivating the driver assistance function, wherein the control unit is configured to adjust the trigger threshold based on a detected distance between the object and the vehicle.

20. The vehicle of claim 19, wherein the control unit is configured to activate the driver assistance function in response to the vehicle reaching the reduced trigger threshold, the driver assistance function comprising at least one of issuing a distance warning, performing a braking assistance function, or executing a maneuver assistance function.

* * * * *